United States Patent Office 2,972,209
Patented Feb. 21, 1961

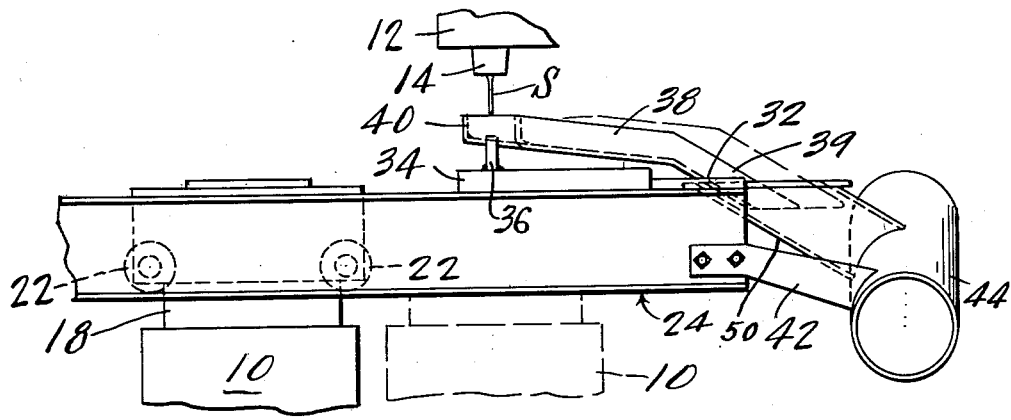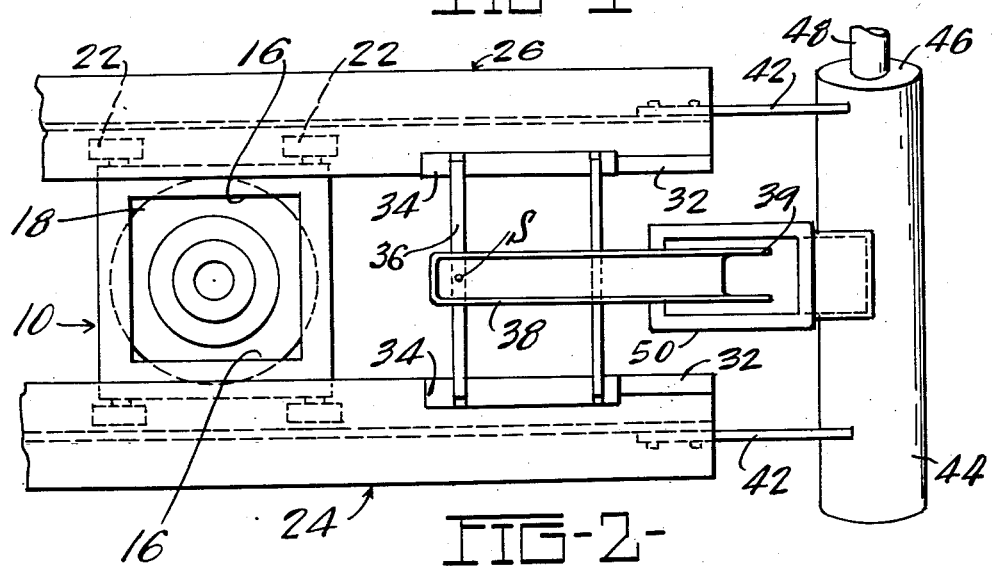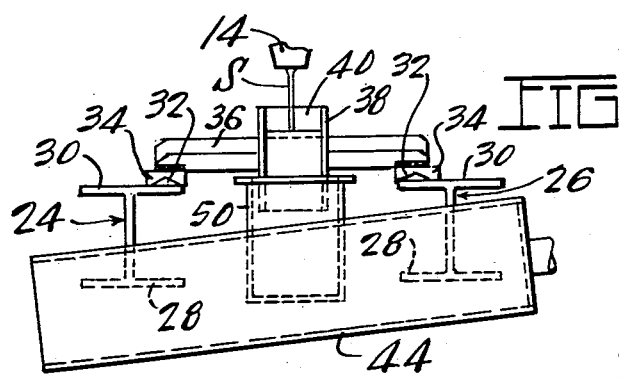

2,972,209

APPARATUS FOR CONTROLLING THE DISTRIBUTION OF MOLTEN MATERIAL

Dale Kleist, St. Louisville, and Henry J. Snow, Newark, Ohio, assignors to Owens-Corning Fiberglas Corporation, a corporation of Delaware Filed Dec. 6, 1956, Ser. No. 626,629

1 Claim. (Cl. 49—14)

This invention relates to apparatus for controlling the distribution or path of flow of molten material, and more especially to a means of diverting the flow of molten glass from its normal path when operations of processing the glass are interrupted.

The invention has particular utility for use with apparatus for forming fibers from a stream of glass or other fiber-forming material wherein a fiber-forming unit or apparatus normally receiving the glass stream may be moved to an ineffective or inoperative position out of the flow path of the glass stream.

The present invention embraces a simple, yet effective means readily movable into a position in the path of a glass stream for diverting the glass to a region remote from the fiber-forming apparatus and which may be retracted when normal fiber-forming operations are to be resumed.

Another object resides in a means for mounting a fiber-forming unit or apparatus wherein the unit may be readily moved to an ineffective or out-of-use position and an arrangement brought into registry with the supply stream of fiber-forming material for diverting the material to a remote zone without impairing the continuity of flow of the material from a forehearth.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is a side elevational view showing a form of means for diverting or conveying away molten fiber-forming material when a fiber-forming unit or apparatus is out of operation;

Figure 2 is a top plan view of the construction shown in Figure 1, and

Figure 3 is an end view of the construction.

The apparatus of the invention and the method of using the apparatus are particularly adaptable for use with a fiber-forming unit for processing heat-softenable material such as glass to fibers, but it is to be understood that we contemplate the utilization of the apparatus for diverting or conveying molten material wherever the same may be found to have utility.

Referring to the drawings in detail, and first with respect to the arrangement shown in Figures 1 and 2, there is diagrammatically illustrated an apparatus or fiber-forming unit 10 of the invention for forming or processing heat-softenable mineral materials, such as glass to fibers. The arrangement for providing a stream of glass or other heat-softenable material is inclusive of a forehearth 12 connected with a suitable melting furnace or receptacle (not shown) in which glass batch or other heat-softenable fiber-forming material may be reduced to a molten or flowable state by the application of heat.

The molten or heat-softened material from the furnace flows into the forehearth 12 providing a supply of the molten material. Disposed beneath and in engagement with the floor of the forehearth is a feeder or bushing 14 which is arranged to receive molten material from the supply through a passage formed in the floor of the forehearth and through which the material flows into the feeder. The feeder is formed with an orifice through which flows a stream S of the molten material.

The fiber-forming unit 10 is preferably supported upon a frame in a manner whereby it may be moved into an operative position in registration with the glass or material feeder 14 as shown in broken lines in Figure 1 or which may be readily moved to an out-of-use position as shown in full lines. As shown in Figures 1 and 2, plates or members 16 are secured to a housing 18 of the fiber-forming unit 10. Pairs of wheels 22 are journally carried by the members 16.

Disposed at each side of the fiber-forming unit 10 are H-shaped frame members 24 and 26, the inner lower flanges 28 of which form track means or ways supporting the pairs of wheels 22 for traverse lengthwise of the frame members 24 and 26. Through this arrangement the fiber-forming unit 10 may be readily moved into and out of operative position relative to the stream feeder 14 for purposes of servicing or repair. When the fiber-forming unit 10 is in operative position, the stream of glass S enters the unit through an opening formed in the housing 18.

The arrangement shown in the drawings embraces a simple, yet effective means of diverting the glass stream when the fiber-forming unit is moved to an out-of-use position. Mounted upon the upper surfaces 30 of the parallel H-shaped frame members 24 and 26 are ways or rails 32 upon which pads or skids 34 are slidably supported for lengthwise movement. Joining the pads or members 34 is a bridge or bar 36 secured thereto by suitable means. Mounted upon the bridge or bar 36 is a tubular trough or chute 38 adapted to accommodate the flow of glass, the chute being formed with an end wall 40.

Secured to the end zones of the frame members 24 and 26 are brackets or supports 42 upon which is mounted a drain tube 44 which is disposed at an angle or downwardly inclined with respect to a horizontal plane as shown in Figure 3. The drain tube 44 is provided with an end wall 46 connected with a water supply pipe 48 whereby a stream of water may be delivered into the inclined drain tube 44 when the latter is utilized to receive glass from the chute 38. A suitable valve (not shown) may be interconnected in the water supply pipe 48 for controlling the flow of water through the drain tube.

Mounted upon and secured to the drain tube 44 is a laterally extending member 50 formed of sheet metal and having its upper zone open to receive a portion 39 of the tubular chute 38. The portion 39 is in telescoping relation with the hollow sheet metal member 50 whereby glass of the stream S delivered into the tubular chute 38 flows down the inclined portion 39 through the member 50 and into the drain tube 44, the glass, contacting the water, being solidified into comparatively small bodies which gravitate or roll along the inclined drain tube 44 and are collected for remelting in the furnace. In order to prevent overheating of the chute, a stream of water may be directed into the chute 38.

In the operation of the glass disposal or drain arrangement, the fiber-forming unit 10 is moved away from alignment with the glass stream and the chute 38 is slidably moved in a left hand direction as viewed in Figures 1 and 2 relative to the hollow sheet metal member 50 to bring the end of the chute beneath the glass stream S.

The glass is thus diverted into the chute and through the drain tube 44 without in any way imparing the continuity of flow of glass from the feeder 14. When it is desired to initiate fiber-forming operations, the chute 38 is telescoped into the member 50 and the fiber-forming unit immediately moved into alignment with the glass stream to the position shown in broken lines in Figure 1.

It is apparent that, within the scope of the invention, modifications and different arrangements may be made other than is herein disclosed, and the present disclosure is illustrative merely, the invention comprehending all variations thereof.

We claim:

Apparatus for handling a glass stream flowing from a molten body of glass including, in combination, a frame comprising a pair of spaced parallel members, a rail supported by each of said members, said rails being arranged in horizontal relation in parallelism with said members, a pad slidably supported upon each of said rails, a bar joining said pads, a downwardly inclined elongated chute mounted on said bar and extending generally lengthwise of the members, a downwardly inclined tube supported by the members and extending in a direction normal to the chute, a hollow member joined with and extending laterally from said tube and opening into the tube, means for conveying a stream of water into the upper portion of the tube, said chute being arranged to be telescoped into the hollow member upon movement of the chute toward the hollow member, said pads being slidable lengthwise of said rails to position the chute in the path of the glass stream for diverting the glass through the hollow member into the tube and into contact with water in the tube.

References Cited in the file of this patent

UNITED STATES PATENTS

| | | |
|---|---|---|
| 906,622 | Fischer | Dec. 15, 1908 |
| 1,744,397 | Lufkin | Jan. 21, 1930 |
| 1,766,979 | Canfield | June 24, 1930 |
| 2,121,143 | Engels | June 21, 1938 |
| 2,188,927 | Slayter | Feb. 6, 1940 |
| 2,192,524 | Powell | Mar. 5, 1940 |
| 2,223,047 | Ramseyer | Nov. 26, 1940 |